United States Patent [19]
Tomlinson

[11] Patent Number: 6,109,211
[45] Date of Patent: Aug. 29, 2000

[54] APPARATUS FOR PREVENTING SCATTERED CAT LITTER

[76] Inventor: Lyla Tomlinson, 244 N. Allumbaugh #212, Boise, Id. 83704

[21] Appl. No.: 09/197,244

[22] Filed: Nov. 20, 1998

[51] Int. Cl.[7] .................................................. A01K 1/01
[52] U.S. Cl. ............................................................ 119/165
[58] Field of Search ................................ 119/165, 166, 119/167, 168; D30/161

[56] References Cited

U.S. PATENT DOCUMENTS

| | | | |
|---|---|---|---|
| D. 351,693 | 10/1994 | Sutton | D30/161 |
| D. 351,694 | 10/1994 | Evans | D30/161 |
| 3,246,630 | 4/1966 | Dearing et al. | 119/1 |
| 3,618,568 | 11/1971 | Breeden | 119/482 |
| 3,885,523 | 5/1975 | Coleman | 119/1 |
| 4,838,202 | 6/1989 | Neu | 119/1 |
| 5,042,430 | 8/1991 | Casmira | 119/165 |
| 5,165,366 | 11/1992 | Harvey | 119/165 |
| 5,195,464 | 3/1993 | Mutter | 119/165 |
| 5,220,886 | 6/1993 | Hyde | 119/165 |
| 5,329,878 | 7/1994 | McCauley | 119/165 |
| 5,361,725 | 11/1994 | Baillie et al. | 119/165 |
| 5,388,550 | 2/1995 | Noble | 119/165 |
| 5,601,052 | 2/1997 | Rood et al. | 119/166 |
| 5,676,090 | 10/1997 | Cannady, Jr. | 119/165 |
| 5,701,844 | 12/1997 | Murphy | 119/166 |
| 5,713,302 | 2/1998 | Walter | 119/165 |
| 5,769,026 | 6/1998 | Kohn | 119/165 |
| 5,797,352 | 8/1998 | Ebert | 119/652 |
| 5,887,546 | 3/1999 | Gruel | 119/165 |
| 5,893,336 | 4/1999 | Vice et al. | 119/166 |
| 5,992,350 | 11/1999 | Manzo | 119/165 |

Primary Examiner—Peter M. Poon
Assistant Examiner—Yvonne Abbott
Attorney, Agent, or Firm—Ken J. Pedersen; Barbara S. Pedersen

[57] ABSTRACT

An apparatus for preventing litter from being scattered upon the floor outside the litter box and beyond, whether strewn by the cat during or after using the litter box, or by the owner when cleaning the litter box. The present invention comprises an enclosure having a front side, a left side, a right side and a base. The present invention is designed to encourage the cat to step out of a litter box and into a tracked litter receptacle for collecting tracked litter. The front side has a portal allowing a cat to step into the invented apparatus. The present invention is further designed to corral not only litter tracked on the bottom of the cats paws, but litter tossed, flipped and spilled out of the litter box. There are many benefits to the present invention including: reduced mess outside the litter box and beyond; reduced grit on hard floors; reduced destruction of carpeting; reduced effort, time and frequency of clean-up; ease of use and handling; ease of emptying; improved aesthetics; and improved sanitation.

20 Claims, 4 Drawing Sheets

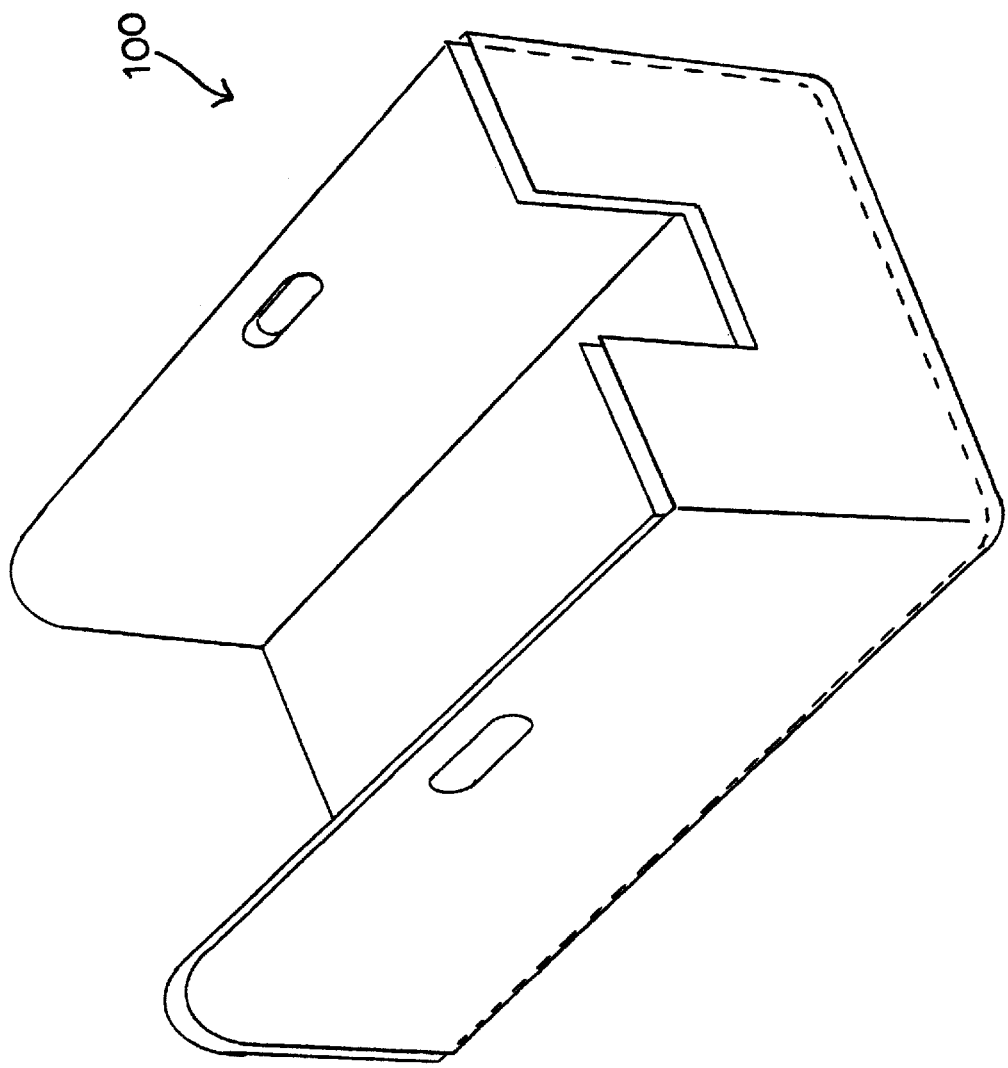

APPARATUS FOR PREVENTING SCATTERED CAT LITTER

BACKGROUND OF THE INVENTION

1. Field of the Invention

The present invention generally relates to domesticated pets. More specifically, the present invention relates to litter box accessories for domesticated cats.

2. Related Art

The use of cat litter as a defecation substrate in litter boxes has been widely used for decades. However, the major drawback with the use of cat litter has been the unwanted transfer of cat litter out of the litter box and onto the surrounding floors. Such transfer occurs in a variety of ways, including (1) litter tossed out of the litter box while the cat robustly digs with its paws in the litter box, (2) litter that gets between the toes and upon the hairs of the cat that is then transferred when the cat flips or shakes its paws to rid them of attached litter, or when the cat walks away from the litter box, and (3) cat litter that the owner of the cat drops outside the litter box as the owner cleans the litter box.

The result of this tracking, flipping, tossing and spilling is an unsightly area surrounding the litter box, grit under human foot if the floor surface is hard, tracking of cat litter throughout the pet owner's house by human and pet foot traffic, and possible staining and destruction of a carpeted floor surface. Litter deposited outside the litter box is often tracked by pet or human foot traffic to other parts of the home, resulting in further sanitation problems.

This tracking problem has been exasperated in recent years with the invention and increased use of clumping cat litter. The particulate size of individual pieces of clumping cat litter are much smaller and finer than traditional "non-clumping" cat litter, thereby resulting in an increased amount of tracking as greater numbers of the smaller particles of clumping litter are able to be carried and flipped out of the litter box by the cat.

The unsightly, gritty, and unsanitary litter scattered outside the litter box is cause for much human aggravation and has been coped with unsuccessfully by the use of a variety of devices. Some of these devices have been designed to catch only the litter tracked on the bottoms of paws and do nothing to corral litter strewn about by other means. Some of these devices are so easy for the cat to avoid stepping on or in that they are essentially ineffective. Other inventions have been cumbersome in appearance and difficult to empty.

Furthermore, these prior art devices have done little, if anything, to control the mess incurred during litter box clean-up. Prior art methods of coping with the mess have involved manual and frequent sweeping, vacuuming, scrubbing and the like.

Many devices have been invented for the reduction and elimination of the tracking problem. For instance: both U.S. Pat. No. 3,246,630 (Dearing, et al.) and U.S. Pat. No. 3,885,523 (Coleman) disclose a "sanitary facility for animals" comprising litter boxes having a built-in screen upon which a cat walks to dislodge cat litter from the cat's paws. Other inventions disclose apparatuses causing the cat to walk across a grated or screened surface to remove cat litter from the cats' paws. See U.S. Pat. No. 5,042,430 (Casmira); U.S. Pat. No. 5,195,366 (Harvey); U.S. Pat. No. 5,195,464 (Mutter); U.S. Pat. No. 5,220,886 (Hyde); U.S. Pat. No. 5,388,550 (Noble); and U.S. Pat. No. 5,361,725 (Baillie, et al.).

Another device, U.S. Pat. No. 4,838,202 (Neu) discloses an "animal litter container" comprising a five-sided box into which a litter box is placed. The Neu invention also is intended to be "easily accessible through both the top and one or more of the sides."

Other patents disclose litter boxes having sloped surfaces for the removal of cat litter from cat's paws. For instance, U.S. Pat. No. 5,676,090 (Canady, Jr.) discloses a "scatter-resistant litter box" having a sloped front compartment with a sloped, carpeted surface for the removal of cat litter from cat's paws; and U.S. Pat. No. 5,713,302 (Walter) discloses a "pet waste containment system" alternatively having a sloped, ramp for the collection of litter.

Another U.S. Pat. No. 5,769,026 (Kohn) discloses an enclosure for a litter box having carpeted pathways for the removal of cat litter from cats' paws.

Another U.S. Pat. No. 5,797,352 (Ebert) discloses a paw cleaning litter mat for placing outside the front of a litter box for the removal of cat litter from cats' paws.

Two design patents, U.S. Pat. No. Des. 351,693 (Sutton) and U.S. Pat. No. Des. 351,693 (Evans), show other methods of collecting tracked litter, each comprising trays set in front of the litter box.

However, none of these patents disclose an enclosure for a litter box that has a singular entrance; that catches litter scattered by a variety of means, from being tracked on the bottom of paws and spilled from the litter box, to being flipped and tossed by the cat's paws; that is adjustable in the combined size of the litter box and apparatus; is easy to empty by merely picking the apparatus up, tiling to the side and pouring into a receptacle; that is lightweight; that is low maintenance; that adds to the aesthetic appearance of the litter box area; that provides a work area in which to clean the litter box without spilling or dropping litter on the surrounding floor; that greatly reduces the frequency that the surrounding area must be cleaned; that provides increased sanitation for the home; and that is used in combination with an existing litter box to make that litter box more efficient.

SUMMARY OF THE INVENTION

The present invention is an apparatus for corralling cat litter before it can be scattered outside the litter box. The present invention comprises a receptacle having a front side wall, a left side wall, a right side wall, and a base. The present invention does not have a back side wall. The front side has a portal allowing a cat to step into and out of the invented apparatus.

The apparatus is preferably of a width to receive a standard sized cat litter box. The preferred litter box is covered, having one-portal. The length and width of the apparatus is such that all entrances to the litter box, except the side of the litter box accessible through the portal of the present invention, are relatively inaccessible to the cat. This feature encourages the cat to use the invented apparatus properly.

The present invention is used by sliding or setting a standard sized cat litter box into the enclosure formed by the three upright walls of the present invention. The litter box must be so positioned within the invented apparatus so that a cat entering the enclosure through the portal in the front of the apparatus can enter the litter box. It is preferred that enough room will be between the front side of the apparatus and the front of the litter box so that the cat can stand with all four paws outside the litter box but within the apparatus. However, if the apparatus is alternatively sized so that the cat is only able to place one paw at a time within the apparatus, the apparatus is still beneficial.

The ideal litter box position is having the front side of the litter box just inside the open back of the apparatus.

However, if available space for the litter box is too small to accommodate the ideal, fully extended litter box-apparatus combination, the litter box can be moved forward inside the present apparatus, toward the front side of the apparatus, reducing the overall size of the combination. Enough space should be left between the front of the litter box and the front portal of the apparatus so that the cat will step into the apparatus upon exiting the litter box, rather than jumping directly from inside the litter box to the floor outside the apparatus.

Upon using the litter box and exiting the litter box, the cat steps within the present invention. Such stepping results in the dislodging of cat litter particles from the paws of the cat. These litter particles are deposited on the floor of the present apparatus instead of being tracked out of the present invention. Most cats do not like the feel of litter adhered to their paws, so they tend to shake and flip their paws to remove the litter. This litter, dislodged when the cat shakes and flips its paws, is sent through the air, hits the walls of the apparatus and falls back to the floor of the apparatus, and is so contained away from the floor area. Then, when the cat steps out of the invented apparatus, the amount of cat litter tracked is considerably less than the amount of cat litter that would be tracked out of a litter box that is not surrounded by the present invention.

The present invention is further used by the pet owner during cleaning of the litter box. The pet owner puts a trash receptacle on the floor of the apparatus in front of the litter box. The caretaker reaches into the litter box, scoops litter clumps, lifts the clumps up, and deposits the clumps into the receptacle. Litter spilled from the litter scoop during this process falls to the floor of the apparatus and is so contained away from the surrounding floor.

To empty the apparatus, the pet owner moves the litter box backward out of the apparatus, picks up the apparatus, tilts it to the side, and pours the collected cat litter into a chosen receptacle, such as a trash can.

There are many benefits to the present invention beyond the main benefit of reducing the tracking of cat litter outside of the litter box.

A second benefit is the reduction of human aggravation associated with stepping on grit outside the litter box, the sight of litter outside the litter box, and the inability to keep the area free of litter without frequent sweeping, vacuuming, scrubbing and the like.

A third benefit is aesthetics. There are a variety of ways that the invention improves aesthetics of the cat litter area. For instance, the tracking of cat litter is unsightly to home owners. Eliminating or decreasing the amount of cat litter tracked into other areas of the home makes the home more attractive. Also, the present invention serves to screen the litter box partially from view, thereby improving the appearance of the area in which the litter box is located.

A fourth benefit is reduced maintenance and labor. First, as the pet owner "scoops" the waste clumps out of the litter box, cat litter particles that are dropped in such a cleaning process fall within the present invention, allowing for easy clean-up. Second, by reducing the area in which cat litter is tracked, the time necessary to clean-up such tracking is greatly reduced. For instance, clean-up of tracked litter is as simple of removing the litter box from the present invention, tilting the present invention to one side to cause all of the loose litter to form into a pile, and then tilting the present invention over a garbage can to cause the piled litter to drop into the trash can. The pet owner does not need to come into contact with the litter. Alternatively, the owner may pour the tracked litter back into the litter box for reuse. Because the apparatus catches both tracked litter and litter tossed through the air by the cat, the frequency of clean-up to the area surrounding the litter box is decreased drastically.

A fifth benefit of the present invention is health, safety and sanitation. By reducing or eliminating tracked litter through the home, the home becomes more healthy and safe. For instance, by reducing the risk of allergy or disease that might be associated with used litter or cat feces. By reducing or eliminating tracked litter, it is believed that such allergies and diseases will also be reduced.

A sixth benefit of the present invention is ease of use and handling. The present invention is preferably of a one-piece design, eliminating the need for assembly. The present invention, whether it is in one-piece or other design, preferably has no mechanical parts. The present invention is also of lightweight design, allowing use by individuals of differing size and strength. Operation is simple and easy to understand.

A seventh benefit of the present invention is forcing the cat to place all four paws within the present invention upon exiting the litter box. Many devices in the prior art are made in shapes and sizes that allow the cat to step through or over them with as little as one footstep. For maximum effectiveness, the cat needs to step into the device with all four paws.

An eighth benefit of the present invention is the ability to use the present invention with the litter box already owned by the cat owner. Many of the devices found in the prior art include a litter box, thus making them usable only to cat owners willing to purchase a new litter box plus the device. In contrast, the present invention is preferably an accessory to a standard litter box, thereby allowing the present invention to be useable by not only those wishing to purchase a new litter box system, but by those already owning a litter box. The efficiency of the existing litter box, is greatly enhanced by the present invention, thereby broadening the market greatly.

A ninth benefit of the present invention is the ability to catch litter both tracked and airborne litter. Many devices in the prior art attempt to stop litter either tracked litter or airborne litter, but not both.

A tenth benefit of the present invention is size adjustability. The combined size of the litter box and apparatus can be reduced or extended, depending on the wishes and needs of the user. The reduced size offer valuable benefits for use in an apartment or small area where the ideal, fully extended combination is not usable, thereby making the apparatus usable by more groups of cat owners.

An eleventh benefit of the present invention is being of a stackable or foldable design, decreasing wholesale and retail storage space and decreasing shipping costs.

BRIEF DESCRIPTION OF THE DRAWINGS

FIG. 4 is a front, perspective view of an embodiment of the present invention having slightly slanted sides, showing the ability to stack multiple units.

DESCRIPTION OF THE PREFERRED EMBODIMENTS

Figure 1:
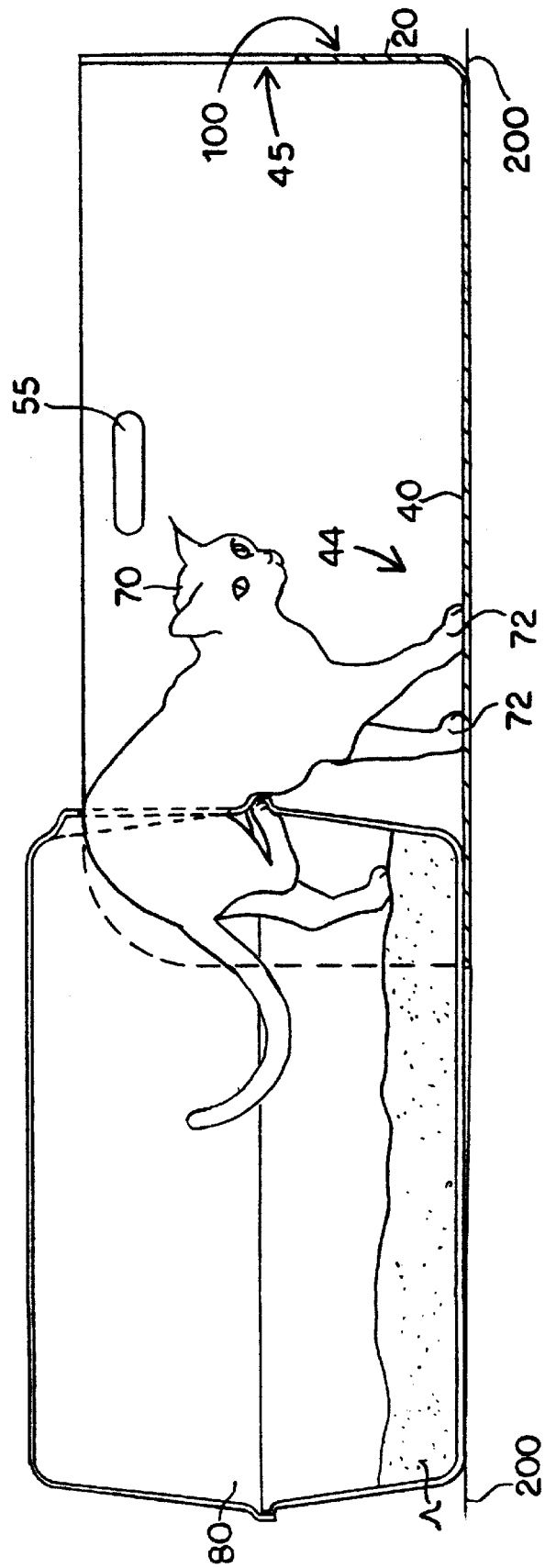
FIG. 1 is a left side, cross-sectional view of the preferred embodiment of the invented device, holding a litter box and being used by a cat.

As shown in the Figures, the present invention is an apparatus for corralling airborne and tracked cat litter 100. The present invention 100 comprises an enclosure having a front side wall 20, a left side wall 60, a right side wall 50 and a base or bottom side 40 for receiving a litter box 80 filled with litter A. The present invention 100 preferably does not have a back side wall.

As shown in FIG. 1, the base 40 is preferably a horizontal, rectangular piece, having two shorter sides and two longer sides. The base 40 preferably is a planar, flat, level surface, having no recessed portions. The left side piece 60 extends upward from one of the base's longer sides and the right side piece 50 extends upward from the other longer side. The front side piece 20 extends upward from one of the shorter sides. Preferably, the left side 60 and the right side 50 are generally parallel, generally opposing mirror images of one another, and are generally perpendicular to the plane within which the front side 20 rests. The front side 20 is attached to and extends between the left side 60 and the right 50 to form a flat-bottomed box having three upending sides. All of said above sides 40, 50, 60 are generally perpendicular to the base 40. As shown in FIG. 4, these sides are preferably slightly slanted so as to allow multiple units to be stacked inside one another for economy of retail and wholesale space and to cut shipment costs. The invented enclosure 100 preferably does not have a back side wall or a lip or other upward protrusion from the plane of the base 40. Preferably, the apparatus 100 is of one-piece construction, for reasons of strength and durability. The invention preferably does not have a top wall covering the enclosure.

Figure 2:
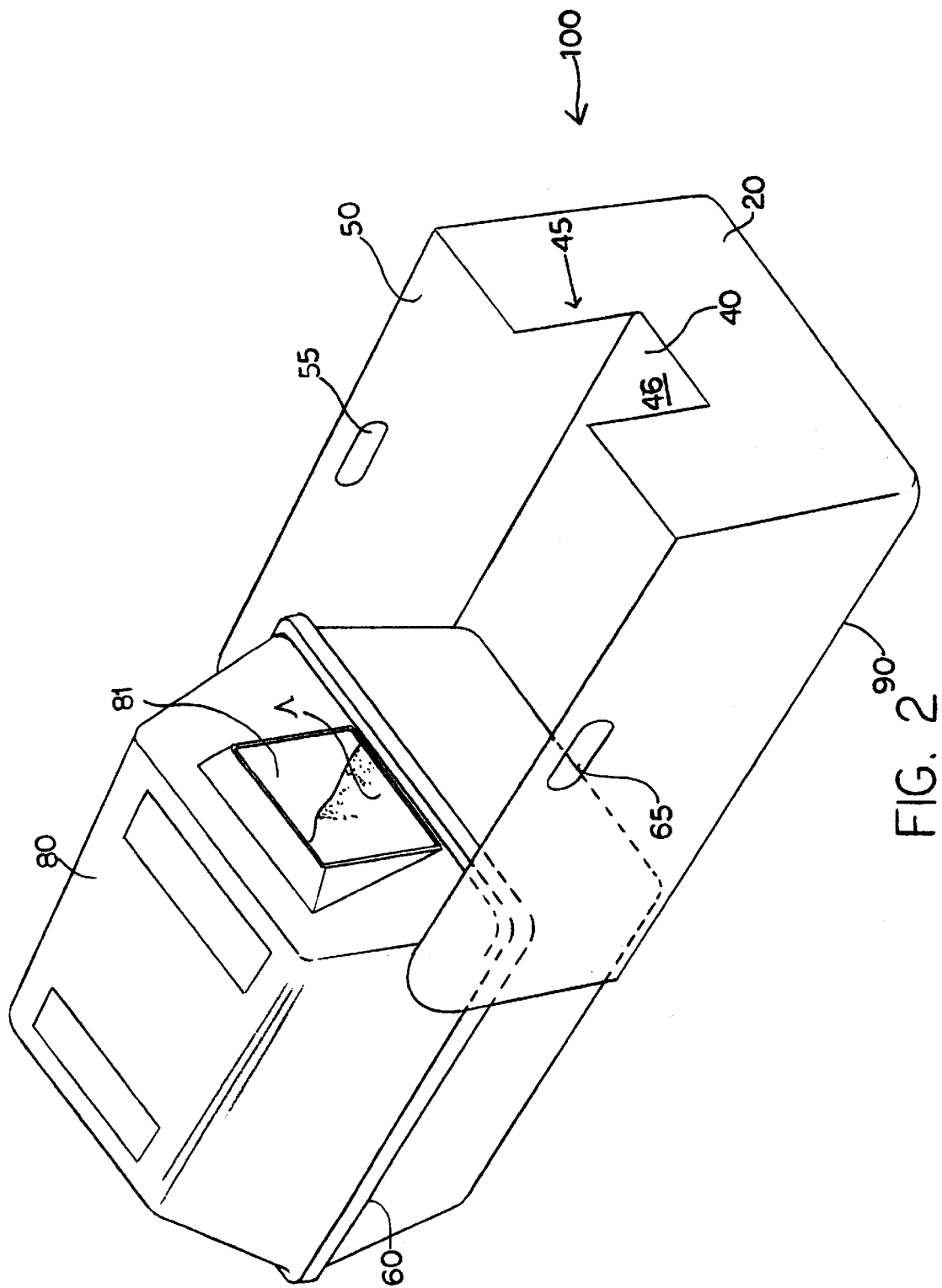
FIG. 2 is a front-left, perspective view of the device of FIG. 1, shown holding a litter box and having the optional scoop caddy.

As shown in FIG. 2, in use, a standard litter box 80 is set within the back portion of the apparatus 100, thereby requiring a cat 70 to step within the apparatus 100 to gain access to the litter box 80. The front of the litter box 80 faces the front side wall 20 of the apparatus 100. The litter box 80 is a separate item and is not necessarily itself considered part of the present invention 100. The area between the front side of the litter box 80, the base 40, the interior of the front side wall 20, the interior of the left side wall 60 and the interior of the right side wall 70 of the apparatus 100 is called the tracked litter receptacle 44.

The front side 20 has a portal 45 allowing the ingress and egress of a cat 70. In use, the cat 70 steps through the portal 45 and into the tracked litter receptacle 44. The cat 70 then proceeds to take a few steps to the litter box 80, where the cat 70 then steps into the litter box 80. The use of more than one portal 45 on the apparatus 10 is also envisioned by the inventor, however, the preferred design has a straight entrance path from the front portal 45 though the receptacle 44, and into the front opening 81 of the litter box, because the front opening 81 and front portal 45 are generally centered on the longitudinal axis of the enclosure between the front end and back end of the enclosure. There are no turns or labyrinth paths to reach the litter box.

The portal 45 of the apparatus is preferably a three-sided opening, having no top piece or part of the front side wall over it to impede the cat's entry or exit in any way. Preferably, the portal is only wide enough to allow the cat easy entrance and exit. The portal 45 preferably extends downward from the top of the front side wall to a point ½ to ⅔ of the way down the wall so that it is convenient for the cat to enter. The shape of the portal 45 may be varied. Alternatively, the portal could be positioned in a right or left side wall close to the front side wall. Alternatively, multiple "punch-out" portals could be created in the apparatus 100, thereby giving the user the option of which portal to "punch-out" and use.

As the cat digs in the litter box 80, cat litter A tossed out of the litter box 80 by the cat 70 is contained within the confines of the tracked litter receptacle 44. Then, upon doing its business in the litter box 80, the cat 70 exits the litter box 80 and steps back within the tracked litter receptacle 44. The cat 70 steps upon the floor surface 46 of the base 40, within the tracked litter receptacle 44. Stepping on the floor surface 46 of the base causes cat litter clinging to the cat's paws 72 to become dislodged. Also, litter flipped off the cat's paws hits the sides and falls to the floor surface 46.

When the cat 70 steps out of the present invention 100 and onto the floor 200 of the room where the litter box 80 is located, much, if not all of the cat litter that was clinging to the cat's paws 72 will remain behind within the confines of the tracked litter receptacle 44. Also, when the pet owner later cleans the litter box 80, the tracked litter receptacle 44 of the present invention serves to contain all particles of cat litter dropped or spilled by the pet owner.

The cleanup of this litter found within the tracked litter receptacle 44 of the present invention 100 is as easy as removing the litter box 80, picking up and tilting the present invention 100 to one side to cause all of the loose litter particles to congregate together in a pile, and then titling the present invention 100 to cause this piled litter to pour into a garbage can or back into the litter box 80.

Preferably, the sides of the apparatus 100 are tall enough, and close enough to the sides of the litter box to deter the cat 70 from entering into the apparatus 100 any way other than through the portal 45. As such, the portal 45 is intended to be the preferred way into and out of the present invention for the cat 70. Such a height also serves to deflect any cat litter A tossed out of the litter box 80 into the tracked litter receptacle 44 of the apparatus 100. Such a height also serves to discourage the cat from jumping over a side wall into or out of the apparatus 100, thereby encouraging the cat to enter and exit through the portal 45, thus allowing the maximum time and paw steps between the time the cat exists the litter box and until the cat exits the apparatus. Taller heights can be aesthetically pleasing when the apparatus 100 is used in combination with the litter box 80, where the apparatus 100 is of a height screening the litter box 80 from view.

The length of the present apparatus 100 is preferably twenty to twenty-five inches, thus allowing the tracked litter receptacle 44 of the apparatus 100 to be as long as eighteen to twenty-three inches when holding a standard, ~18 inch long litter box.

The present invention is installed around the litter box 80 in one of two preferable methods. The first method is placing the apparatus 100 on the floor 200 and then setting the litter box 80 into the rear portion of the apparatus 100. The second method entails setting the litter box 80 onto the floor 200, setting the apparatus 100 on the floor 200 directly in front of the litter box 80, and then siding the front portion of the litter box 80 into the rear portion of the apparatus 100, or vice versa. With both methods, because the rear portion of the apparatus 100 is open and without an upending wall or lip, it accommodates some adjustment of the litter box location along the length of the apparatus. Preferably, the length of the apparatus 100 is longer than the length of the litter box 80 contained therein.

The present invention 100 is preferably made of simple, lightweight construction, for example, corrugated cardboard, plastic or other lightweight material may be used. The apparatus 100 may be folded and secured into the preferred shape, molded or otherwise formed.

Figure 3:
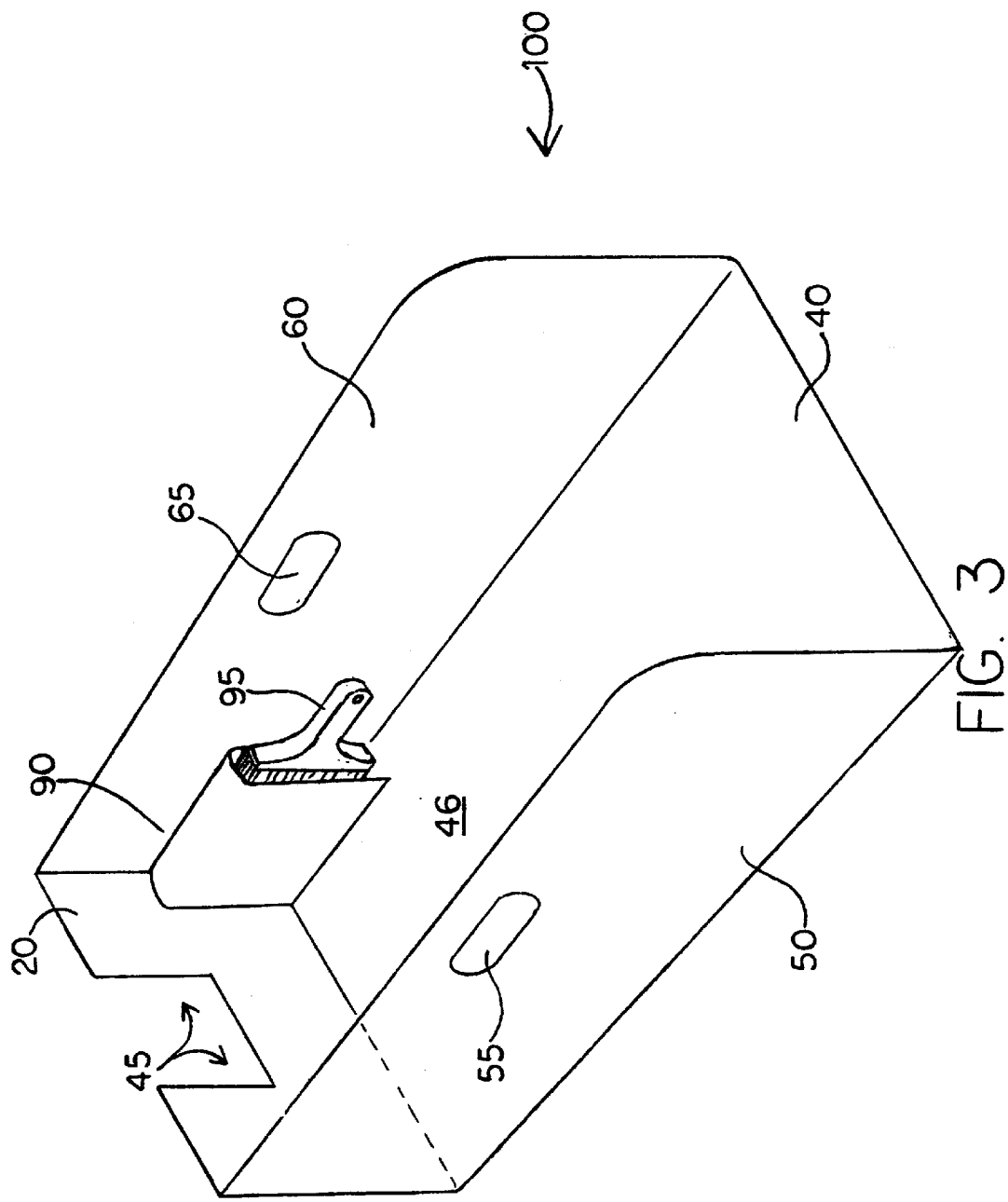
FIG. 3 is a rear-right, perspective view of the device of FIG. 2, shown with the optional scoop caddy.

As shown in FIG. 3, the inventor also envisions the optional use of a scoop caddy 90. This scoop caddy 90 serves as an easily accessible place where the pet owner can store a cat litter scoop 95 out of sight when not in use. This caddy 90 can be located any number of locations on the present invention 100 including on the inside or outside of one of the sides. Shape of this caddy 90 is dependent upon the litter scoop 95 wished to be held.

The preferred caddy 90 has a vertical opening in which to insert the scoop 95. The preferred caddy 90 is affixed to the front right or front left side of the apparatus 100. The preferred opening to the scoop caddy 90 faces the back of the apparatus 100. The solid top wall of the caddy 90 prevents litter from being flipped into the caddy and also hides the scoop 95. The positioning of the caddy 90 as such serves to prevent litter from being trapped between the front wall of the apparatus and the caddy 90 and also allows litter inside (including litter which falls from the scoop 95 while the scoop is not in use) and outside the caddy to slide freely toward the back of the apparatus 100 at cleaning.

The right and left sides 50, 60 of the present invention also preferably contain handles 55, 65 for assisting in the emptying and lifting of the present invention 100. Shown in the Figures is an oblong hole shaped handle 55, 65 cut into the sides 50, 60, however, other types of handles are envisioned as long as the handles allow the apparatus 100 to be easily carried and lifted. The handles are preferably near the center of the length of the apparatus and near the upper surface of the left and right sides 60, 50.

The inventor also envisions the less preferred use of a piece of screening, grating, carpeting or other material (not shown) for assisting in the removal of cat litter from the paws 72 of the cat 70. Such material would cover at least a part of the base 40 of the apparatus, preferably only within the tracked litter receptacle 44, and would serve as a cover of surface 46. Such coverage may leave a left and a right margin for the collection of litter and for assisting in the pouring of the litter out of the apparatus 100. This material may be either fixedly or removably attached within the apparatus, preferably the material is removable for cleaning purposes. However, the use of such material is less preferred because it reduces the ease of pouring litter out of the present invention 100.

Although this invention has been described above with reference to particular means, materials and embodiments, it is to be understood that the invention is not limited to these disclosed particulars, but extends instead to all equivalents within the scope of the following claims.

I claim:

1. An apparatus for preventing scattered cat litter comprising:
    an enclosure having:
        a base;
        a front side wall, said front side wall having a portal for easy ingress and egress by a cat into and out of said enclosure, said front side wall upwardly extending from said base;
        a left side wall and an opposing right side wall, said left side wall and said right side wall attaching to said front side wall and upwardly extending from said base;
        said enclosure receiving therein a litter box having a front;
        said enclosure not having a back wall so that the litter box may slide in and out of the enclosure, toward and away from the front wall respectively; and,
    the enclosure further having a tracked litter receptacle, said receptacle defined by the area within the enclosure between the front of the litter box, the base, the front side wall, the left side wall and the right side wall.

2. An apparatus, as in claim 1, wherein said base has no recessed portions.

3. An apparatus, as in claim 1, wherein said enclosure does not have a top wall covering said enclosure.

4. An apparatus, as in claim 1, wherein said enclosure is not attached to said litter box.

5. An apparatus, as in claim 1, wherein said tracked litter receptacle is adapted to collect therein tracked cat litter tracked out of a litter box by a cat exiting from said litter box.

6. An apparatus, as in claim 1, wherein said left side wall and said right side wall contain handles for assisting in the lifting of the apparatus.

7. An apparatus, as in claim 1, wherein said enclosure further comprises a scoop caddy for the holding of a cat litter scoop.

8. An apparatus, as in claim 1, wherein said front side, said left side and said right side are slightly slanted for allowing multiple units to be stacked inside one another.

9. An apparatus, as in claim 1, wherein said base is covered with a grating material for assisting in the removal of cat litter from the paws of cats.

10. An apparatus, as in claim 1, wherein said base is covered with a carpeting material for assisting in the removal of cat litter from the paws of cats.

11. An apparatus for preventing scattered cat litter comprising:
    an enclosure having:
        a front end and a back end and a longitudinal axis extending between the front end and the back end;
        a generally horizontal base having a top surface;
        a front side wall having a portal for easy ingress and egress by a cat into and out of said enclosure, said front side wall upwardly extending from said base near the front end; and
        a left side wall and an opposing right side wall, said left side wall and said right side wall connecting to said front side wall and upwardly extending from said base;
        wherein the enclosure back end is open with no back wall upending from the base near the back end; and
    a litter box having a front and sides walls generally perpendicular to the front, the litter box being received in the enclosure near the back end and extending through the open back end, so that the litter box is slidable in and out of the enclosure through the open back end, toward and away from the front wall, respectively;
    the enclosure further having a tracked litter receptacle area, said receptacle defined by the top surface of the enclosure base between the front of the litter box and the enclosure front wall, and between the left side wall and the right side wall.

12. An apparatus as in claim 11, wherein the litter box has a front opening, and the portal and the front opening are centered on the longitudinal axis of the enclosure.

13. An apparatus, as in claim 11, wherein said base top surface is flat and has no recessed portions.

14. An apparatus, as in claim 11, wherein said enclosure does not have a top wall extending over the litter box.

15. An apparatus, as in claim 11, wherein said enclosure is not attached to said litter box.

16. An apparatus, as in claim 11, wherein said left side wall and said right side wall contain handles for assisting in the lifting of the apparatus.

17. An apparatus, as in claim 11, wherein said enclosure further comprises a scoop caddy for holding of a cat litter scoop.

18. An apparatus, as in claim 11, wherein said front side, said left side and said right side are slightly slanted for allowing multiple units to be stacked inside one another.

19. An apparatus, as in claim 11, wherein said receptacle area is covered with a grating material for assisting in the removal of cat litter from the paws of cats.

20. An apparatus, as in claim 11, wherein said receptacle area is covered with a carpeting material for assisting in the removal of cat litter from the paws of cats.

* * * * *